FTP8102 XR 3,715,664

United States Patent [19]

Ikrath

[11] 3,715,664

[45] Feb. 6, 1973

[54] METHOD OF REPEATING RF-BORNE SIGNAL ACROSS AN EARTH BARRIER

[75] Inventor: Kurt Ikrath, Elberon, N.J.

[73] Assignee: The United States of America as represented by the Secretary of the Army

[22] Filed: Feb. 12, 1971

[21] Appl. No.: 114,853

[52] U.S. Cl. ..........................325/9, 325/10, 179/82

[51] Int. Cl. ..........................................H04b 7/14

[58] Field of Search..........325/1, 9, 10, 28, 29, 9–11; 179/82; 324/5–7; 181/.5 T, .5 EC; 340/15, 15.5, 17

[56] References Cited

UNITED STATES PATENTS

| | | | |
|---|---|---|---|
| 3,562,749 | 2/1971 | Uchimoto et al. | 325/29 |
| 3,268,859 | 8/1966 | Sato | 325/28 |
| 3,323,063 | 5/1967 | Walker et al. | 179/82 |
| 3,273,112 | 9/1966 | Hobson | 325/28 |

*Primary Examiner*—Albert J. Mayer
*Attorney*—Harry M. Saragovitz, Edward J. Kelly, Herbert Berl and Arthur L. Bowers

[57] ABSTRACT

A method of relaying VHF in mountainous terrain that includes planting a receiver and a transmitter, that operate at the same carrier frequency, on opposite sides of a mount such that the mountain between them shields the receiver from rf radiated by the transmitter, and transferring intelligence on the rf detected by the receiver through the earth to the transmitter by means of a magnetic or seismic link. The magnetic link can transfer audio band frequency while the seismic link can transfer mark-space coded intelligence.

3 Claims, 4 Drawing Figures

INVENTOR,
KURT IKRATH

BY: Arthur L. Bowers AGENT
Harry M. Saragovitz,
Edward J. Kelly & Herbert Berl
ATTORNEYS

METHOD OF REPEATING RF-BORNE SIGNAL ACROSS AN EARTH BARRIER

BACKGROUND OF THE INVENTION

Radio reception and more particularly VHF reception is poor in hilly and mountainous terrain where the receiver or at least the receiver antenna is not located on one of the high peaks. In those situations where radio equipment is airdropped, placement on a mountain peak by airdrop is virtually impossible and attempts to do so endangers the air crew. Also, radio equipment planted on a high peak is subject to windstorm damage; a radio equipment, those employing solid state components, is particularly liable to be destroyed by lightning or damaged by corona. Under military conditions, the equipment can be sighted comparatively easily on a peak and destroyed or kept under surveillance and subjected to jamming at a strategic time.

SUMMARY OF THE INVENTION

An rf receiver and a companion transmitter operating at the same carrier frequency are mounted on the same hill, ridge or mountain substantially below the peak and so located that the earth and rock between them shields the receiver from the output of the transmitter. The receiver is as high up along the rising terrain consistent with protection against natural hazards and from attack, to optimize reception. The transmitter is lower down along its side if necessary for completely shielding the receiver from the transmitter output. In the vicinity of the receiver and transmitter respectively there are the equipments for a through the earth communication link. In one embodiment, the link includes a cylindrical coil for transmitting the intelligence detected by the receiver to a loopstick coupled to the transmitter and since this link can operate at a frequency upwards of 50KHz, audio band intelligence and even wider band can be transmitted. For airdrop, the transmit coil is constructed for generating mutually perpendicular XYZ fields and the sensing coil is similarly constructed so that orientation of the coil assemblies on landing is not critical. The combination serves as a high gain repeater that intercepts rf which is at the operating frequency of the receiver and transmitter, detects intelligence modulated on the intercepted rf, generates an LF carrier, modulates the LF carrier with the intelligence detected on the rf, propagates the LF modulated with the intelligence through the earth to the vicinity of the transmitter, intercepts the LF carrier in the vicinity of the transmitter, detects the intelligence modulated on the intercepted LF, generates rf which is at the operating frequency of the receiver and transmitter, modulates the generated rf with the intelligence detected from the intercepted LF carrier, and transmits the modulated rf. The repeater combination accomplishes the function described without as much rf spectrum as other more conventional repeaters. The earth between the receiver and transmitter provides rf isolation and prevents feedback. Signal-to-noise ratio is not changed appreciably. In another embodiment, a very low frequency seismic link is established by receiver and transmitter. The seismic elements must be seated correctly on the ground for coupling to the earth and thus cannot be airdropped. Mark-space coded intelligence is transmitted on the seismic link.

An object of this invention is to provide an efficient radio relay technique for mountainous terrain that shelters equipment from natural hazards and from hostile military action.

A further object is to provide a radio relay arrangement for military applications in mountainous terrain that makes unnecessary placement of the equipment on a high peak.

A further object is to provide a radio relay arrangement that uses less rf spectrum than more conventional repeaters.

These, as well as other objects and advantages of the present invention, will become apparent from the following detailed description and drawings, in which.

DETAILED DESCRIPTION OF THE PREFERRED EMBODIMENT

Figure 1:
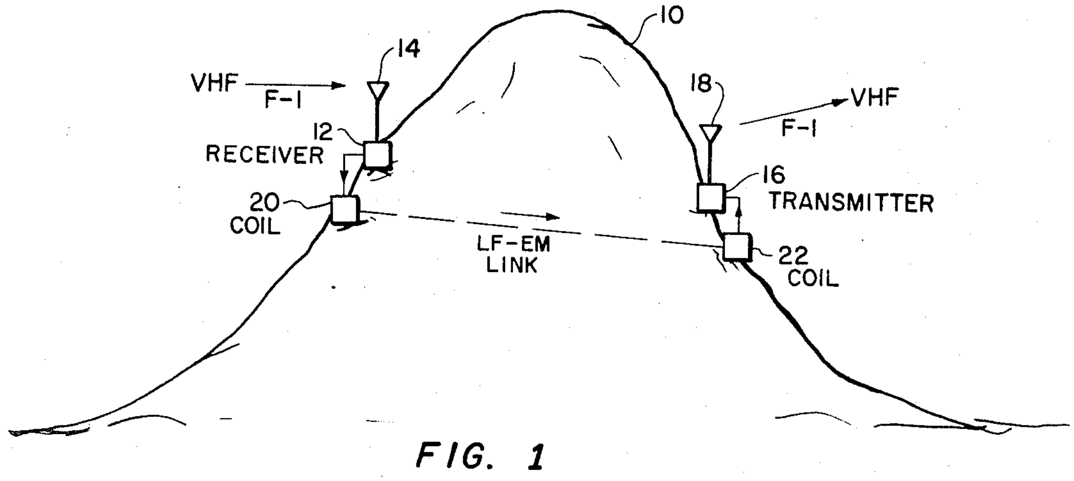
FIGS. 1 and 2 show schematically two radio repeater arrangements in accordance with the teachings of this invention.
Figure 2:
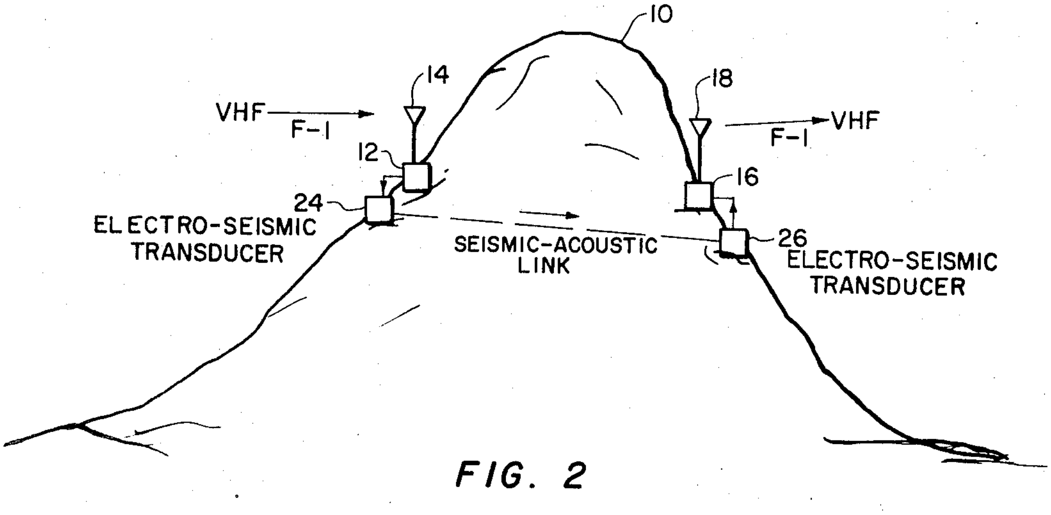
Figure 4:
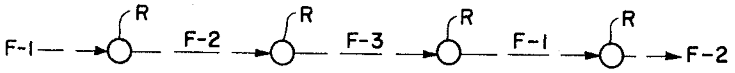
FIG. 4 illustrates diagrammatically a conventional repeater arrangement and assigned frequency bands.

In both FIGS. 1 and 2 there is shown a peak 10 in hilly, mountainous, or scarred terrain and which may be rock or a combination of soil and rock. In both figures, a receiver 12 and its antenna 14 is located along a face, side, slope, ridge or rise, referred to hereafter generically, as a rise and and a transmitter 16 and its antenna 18 located along an opposing rise. Receiver and transmitter operate at the same carrier frequency F–1; while the rf carrier frequency generally will be in the VHF band, and is so indicated on the drawing, it is not intended as a limitation. For better reception, the receiver and its antenna are located as close to the peak as is consistent with its protection requirements and with isolation from the transmitter. The transmitter and its antenna may be somewhat further down from the peak if necessary to ensure rf isolation of the receiver from the transmitter. The minimum linear distance between receiver and transmitter is influenced by whether the antennas are directional and, also by the power output at the transmitter. Known types of radio receiver and transmitter equipment having output and input stages respectively adapted for coupling to transducers discussed hereinafter are employed.

Figure 3:
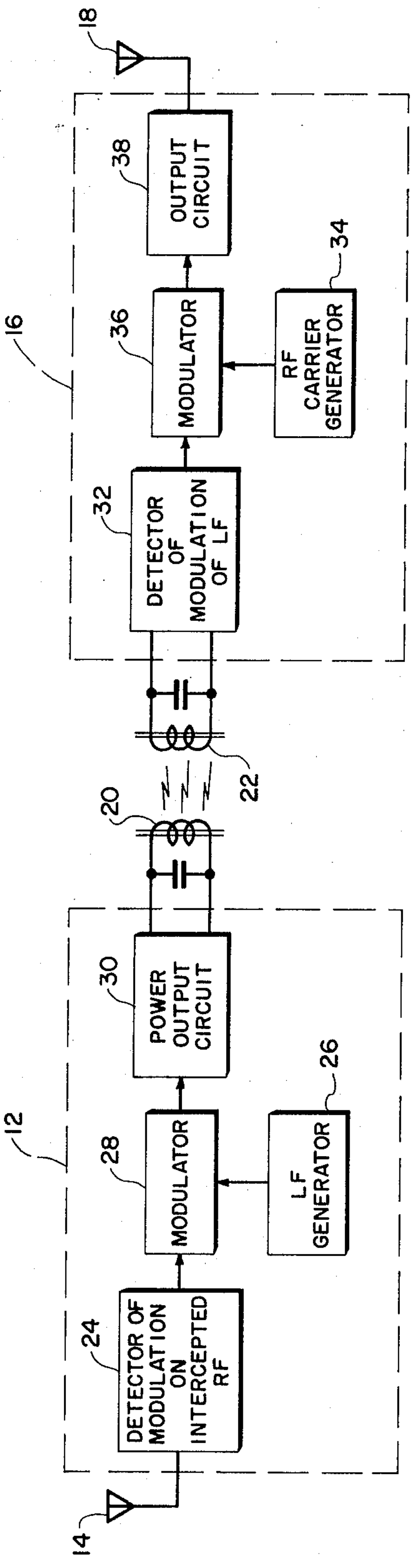
FIG. 3 is a more comprehensive diagram of the equipment shown in FIG. 1.

In FIG. 3 a tuned radiating coil 20 is coupled to the receiver 12 and a tuned sensing coil 22 is coupled to the transmitter 16. The receiver 12 includes a detector 24 of signal modulation on the rf at the operating frequency of the receiver, intercepted by the antenna 14, an LF carrier generator 26, a modulator 28 for modulating the LF carrier with the intelligence detected from the rf and a power output circuit 30 that feeds the tuned coil 20. The sensing coil 22 is coupled to a detector 32 of modulation on the sensed LF, in transmitter 16. The transmitter 16 also includes an rf carrier generator 34, a modulator 36 for modulating the rf with the intelligence detected from the sensed LF and an output circuit 38 coupled to antenna 18. The two tuned coils are designed to accommodate the bandwidth of the signal detected from the VHF around a selected center frequency, which is the carrier frequency of the LF-EM link shown in broken lines in FIG. 1. LF-EM is an abbreviation for low-frequency-electromagnetic. The link is described as electromagnetic rather than magnetic because electric fields are induced in the soil by the magnetic field generated by radiating coil 20. The coil 20 changes current in the coil to a correspondingly varying magnetic field and conversely the coil 22 changes sensed magnetic field to correspondingly varying current. Electric field that may be generated is not sensed, per se. The LF carrier frequency is not critical being influenced by known considerations. The frequency must be high enough to carry the band of the signal detected from the VHF. Beyond that, coil size becomes a factor. If the carrier frequency is too low, the coil 20 is of unwieldy size and weight. At the other extreme, if the frequency is too high, ohmic losses in the soil as well as in magnetic core material become significant thereby limiting transmission efficiency. However, there is operability even under less than optimum operating parameters. An LF carrier frequency selected in the range 50KHz–200 KHz yields good results. The coil 20 is designed for relatively high current with a low loss core. The coil 22 is a small fraction of the size of the coil 20 and is essentially a loopstick antenna. The coils may be supported above the ground, on the ground or at shallow depth in the ground. The transmit coil 20 and the sensing coil 22 are substantially parallel to one another. Insofar as is possible, the transmit coil is oriented parallel to the ground and perpendicular to a line between receiver and transmitter locations. Particularly, if there is wet soil in the vicinity, ohmic losses are lower if the transmitter coil is oriented parallel to the ground. The sensing coil 22 is adjusted until reception is optimum.

One superior design for the coil 20 is based on descriptions in Electronic Design 14, July 5, 1967, page 24, column 1 and also in Telecommunications, Volume 2, Nov. 11, 1968, pages 28–30. The design disclosed in the publications includes a sheet or web of silicone rubber throughout which there is a homogeneous distribution of carbonyl iron powder. The iron-loaded silicone rubber sheet is overlaid with a thin film of insulation material such as Mylar and together are rolled up on a rigid nonmagnetic rod. Mylar is used as a barrier against radial eddy current. A litz wire coil is on the core and the assembly is enclosed in a nonmagnetic housing preferably of fiberglass. While this coil design is advantageous, it is not essential to the success of the technique.

Where the equipment is airdropped, orientation of the coils on the ground is a matter of chance. For this use, the coils and cores of the transmitter coil are constructed as three joined mutually perpendicular coil assemblies joined and housed together.

In the arrangement shown in FIG. 1 wherein the through-the-earth link is established magnetically, a discontinuity in the hill such as a cut in the peak or a cave has relatively little effect on the earthborne signal and is not a barrier to the signal.

In FIG. 2, a seismic-acoustic transmitter 24 is coupled to the output of the rf receiver and a seismic-acoustic sensing unit 26 is coupled to the input of the rf transmitter. Seismic units suitable for, and that have been employed successfully for this purpose, are described in U.S. Pat. No. 3,296,589 and are variously utilized in the techniques described in U.S. Pat. Nos. 3,268,029 and 3,302,745 and 3,302,746.

The seismic elements shown and described in the references are analogous to loudspeaker units designed for coupling to the ground rather than to air. They are tuned to operate at about 80HZ. The choice of 80HZ as the seismic signal carrier is a compromise between conflicting requirements. High radiation efficiency and large information transmission rates require the use of higher carrier frequency but small propagation loss and avoidance of audible coupling to the air dictate lower frequency.

Avoidance of power line and earth current interference in the electrical part of the system rule out the use of 50 and 60HZ. Difficulties with conversion, transformation, and noise at lower frequencies narrow the choice of carrier frequency for the seismic link to a frequency in the band 70 to 100HZ. For relatively soft earth, i.e., loose sand and gravel, carrier frequency should be between 78HZ and 83HZ. Soft earth seismic transducers should have maximum driving power on the order of 10 watts. If the seismic transducer delivers too much power, the excess is largely wasted in earth deformation. A hard rock seismic transducer should be operated at about 80HZ; using 60 watts of driving power, seismic signal was successfully transmitted from the surface to a site in a mine at a vertical depth of 1,600 feet and also was successfully transmitted in hilly terrain slope-to-slope over one-half mile in range. It was apparent that much higher power can be used in coupling to hard rock. Because seismic transducers as described in the references couple signal energy to the ground in one orientation only, they cannot be airdropped. Modulation carried by a VHF signal that can be transferred to a seismic link operating at such low frequency, is obviously limited. Mark-space coded signals have been successfully transmitted by a seismic link in a repeater arrangement as shown in FIG. 2. Gaps in the rock, such as crevices and caverns, are for more serious barriers to a seismic link as in FIG. 2 than to a magnetic link as in FIG. 1. Seismic signal delivered to hard rock distributes as surface wave modes and a conical penetration mode. The surface wave mode is scattered by the rough terrain and cannot propagate over the peak. Scatter of the emitted seismic surface wave modes in conjunction with the directionality of the penetration underground radiation minimize detectability of the seismic signal on the seismic transmitter side of the mountain and enhance signal detection on the receiver side of the mountain.

In the two techniques shown in FIG. 1 and FIG. 2, VHF in the operating band of the receiver is intercepted and detected. The receiver generates in its power output stage electrical current at the carrier frequency of the earthborne link and modulated with the intelligence detected from the VHF. The power output stage is coupled to the transducer, the transmitting coil in FIG. 1 and the seismic transducer in FIG. 2, which transmits signal energy from the power output stage of the receiver into the environment as earth penetrating energy of the same waveform as at the output stage of the receiver. The earth penetrating energy is sensed by the transducer located at the transmitter, the signal is detected and the VHF carrier of the transmitter is modulated with the signal. The transmitter radiates essentially the same VHF waveform as is sensed by the receiver, allowing for time delay introduced by the earth link.

A major advantage of this invention resides in the fact that it eases the problems of frequency assignment in a crowded spectrum used by a military force in the field. Units of the military force supplied with radio communication equipment are assigned arrow frequency bands within the available spectrum. The frequency assignment problem is compounded by mobile units. A chain of repeaters can add appreciably to the problem. A conventional repeater system needs a minimum of two assigned frequency bands. FIG. 3 shows a chain of repeaters R. In the first repeater of the chain, the input band is F1 and the output band is a noninterfering band F2. Under ideal conditions, the next repeater in the chain would have an input band F2 and an output band F1. However, where atmospheric conditions and reflecting terrain, as in hilly country, might enable F1 that reaches the first repeater also reach the third repeater at odd times, the output band of the second repeater and the input band of the third repeater cannot be F1; it must be a third band F3. The three bands F1, F2, F3 constitute a large demand on the available frequency spectrum. Using the teachings of this invention, the chain of repeaters in hilly mountainous terrain operate on one band F1 reducing the complexity of frequency assignment from a crowded spectrum.

The invention described utilizes mountainous terrain features to advantage for isolation between receiver and transmitter and because the equipments may be substantially below the peak, airdrop for the magnetic type is facilitated. The equipment is relatively concealed and is afforded protection from lightning and windstorm. Furthermore, the invention can be practiced with existing equipments and does not require expensive development of new components.

It should be understood, of course, that the foregoing disclosure relates to only a preferred embodiment of the inventive process and that numerous modifications or alterations may be made without departing from the spirit and scope of the invention as set forth in the appended claims.

What is claimed is:

1. A method of relaying modulated rf in hilly, mountainous or scarred terrain comprising the steps of intercepting the rf in the atmosphere at a first site backed by a rise in the terrain, detecting the modulation of the intercepted rf, generating LF electrical current and modulating the LF electrical current corresponding to the detected modulation on the intercepted rf, converting the LF electrical current at the first site to earth-penetrating energy of corresponding waveform, sensing the earth-penetrating LF energy at a second site separated from the first site by the rise in terrain where the rise in terrain between the two sites blocks transfer of rf between the two sites, detecting at the second site the modulation on the sensed earth-penetrating LF energy, generating rf of the same frequency at the second site and modulating the rf in accordance with the modulation detected at the second site and radiating the modulated rf from the second site at higher intensity than the rf intercepted at the first site.

2. The method of relaying rf in hilly, mountainous or scarred terrain as defined in claim 1 wherein the earth-penetrating energy is magnetic.

3. The method of relaying rf in hilly, mountainous or scarred terrain as defined in claim 1 wherein the earth penetrating energy is seismic.

* * * * *